United States Patent
Horne et al.

(10) Patent No.: US 6,413,927 B1
(45) Date of Patent: Jul. 2, 2002

(54) PROCESS FOR STABILIZING PARTICULATE ALKALI METAL PERCARBONATE

(75) Inventors: Graham R. Horne, Great Sankey; Alun P. James, Blundesllsands; Daniel R. Baker, Stockton Heath, all of (GB)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 09/463,769

(22) PCT Filed: Jul. 31, 1998

(86) PCT No.: PCT/EP98/04965
§ 371 (c)(1),
(2), (4) Date: Mar. 30, 2000

(87) PCT Pub. No.: WO99/06321
PCT Pub. Date: Feb. 11, 1999

(30) Foreign Application Priority Data

Aug. 1, 1997 (GB) .............................................. 9716139

(51) Int. Cl.⁷ .............................................. C11D 17/00
(52) U.S. Cl. ...................................................... 510/441
(58) Field of Search ......................................... 510/441

(56) References Cited

U.S. PATENT DOCUMENTS 4,009,113 A  2/1977  Green et al.
5,665,427 A  * 9/1997  Horne et al. ................. 427/212

FOREIGN PATENT DOCUMENTS

| DE | 19506004 A1 | 8/1996 |
|----|----|----|
| EP | 0552053 A1 | 7/1993 |
| GB | 1553505 | 9/1979 |
| GB | 1578062 | 10/1980 |
| JP | 60116625 A | 11/1983 |
| JP | 06-157010 | 3/1994 |
| WO | WO 95/18065 | 7/1995 |
| WO | WO 95/23208 | 8/1995 |

OTHER PUBLICATIONS

A. Davidsohn and B.M. Milwidsky, *Synthetic Detergents*, Halsted Press, a Division of John Wiley & Sons, Inc., New York, 1978, Chapters 2, 4, and 7, pp. 8–37, 68–93, and 208–251.

* cited by examiner

*Primary Examiner*—Yogendra N. Gupta
*Assistant Examiner*—John M Petruncio
(74) *Attorney, Agent, or Firm*—Larson & Taylor PLC

(57) ABSTRACT

A process for stabilising particulate alkali metal percarbonate involves coating it with an aqueous solution, preferably concentrated, of a non-reducing oligomeric saccharide, preferably sucrose and especially together with an inorganic salt co-coating agent. The preferred co-coating agents are alkali metal silicate, sulphate, carbonate and carbonate chloride. Coated percarbonate is provided having an excellent combination of solubility, and stability, even with low amounts of coating agent.

27 Claims, No Drawings

PROCESS FOR STABILIZING PARTICULATE ALKALI METAL PERCARBONATE

The present invention relates to a process for stabilising particulate alkali metal percarbonate, and particularly to a coating process therefor, to the particulate percarbonate having improved stability so produced and to washing or bleaching compositions containing the same.

It is well known that particulate alkali metal percarbonates, including sodium percarbonate in particular, can be used as bleach additives for addition to detergent compositions, and as bleaching compounds in detergent powder mixtures, eg for domestic clothes washing or in dishwashing compositions. In comparison with alkali metal perborate tetrahydrate, they have the advantage of dissolving more rapidly at temperatures in the range of 20° C. to 40° C., which is becoming increasingly beneficial in view of the trend towards lower clothes washing temperatures and the use of a bleach activator in conjunction with the bleach. Another advantage of percarbonates is that they are environmentally friendly. However, percarbonates have a known disadvantage of decomposing more quickly than sodium perborate tetrahydrate during storage in the powdered state, particularly if stored in a damp atmosphere and in washing or detergent compositions. Moreover, other constituents of washing compositions such a alkaline builders are known to accelerate the rate of decomposition of percarbonates.

In order to improve the stability of percarbonates, and particularly sodium percarbonate, it has been proposed to treat the surface or the surface layer of the percarbonate particles with a wide range of materials, and in particular to coat or encapsulate the percarbonate with those materials. A wide range of organic and/or polymer compounds such as paraffins, carboxylic acids, polyols, vinyl resins etc. and inorganic compounds such as silicates, borates, perborates, boric acids, carbonates, chlorides, sulphates and phosphates have been proposed as coating materials. There remains, however, a continuing need to locate alternative or improved means for improving the stability of percarbonates.

In WO 95/18065, Solvay Interox has disclosed the use of complexes of boric acid with polyols or hydroxycarboxylic acids as coating agents for percarbonates, including, without any particular emphasis, complexes of boric acid with saccharides. Research has shown that coating agents incorporating boric acid or borates are amongst the most effective coating agents for stabilising percarbonate, including their complexes with the polyol/hydroxycarboxylic acids, but some potential customers for percarbonates dislike the presence of boron possibly because they fear that its use in bleaching or washing compositions may be prohibited or curtailed. Accordingly, it remains desirable for producers of percarbonate to continue to try to develop boron-free coating materials.

In the course of devising the instant invention, a number of the organic materials were tested which had been contemplated in WO 95/180650 in complexes with the oxyboron compound. Amongst those materials, saccharides were tested and it was found that there was a substantial difference between them in their performance at stabilising the percarbonate, and particularly when the percarbonate is incorporated in detergent or washing compositions. In particular, it was found that lactose, alternatively called milk-sugar, provided relatively poor stability when employed in a low proportion, even though it was alleged by Sunstar KK et al in JP 60116625 that a peroxide (5% potassium persulphate and 26% sodium percarbonate) coated with 15–25% milk sugar showed good stability in an artificial teeth cleaning composition.

The present invention provides a process for stabilising a particulate alkali metal percarbonate by coating it with an effective amount of a coating material characterised in that the coating material comprises not more than 5% by weight, based on the coated material of a non-reducing oligomeric saccharide.

Herein by the term effective amount is meant an amount such that the rate of decomposition of percarbonate is reduced in comparison with the corresponding uncoated percarbonate, for example when stored in an atmosphere at 80% relative humidity and 32° C. in the presence of its own weight of zeolite 4A as described hereinafter.

Herein, during the coating process, the coating material is brought into contact with the particulate percarbonate, and especially suitably in the form of an aqueous solution.

Without being bound by any theory, it is believed that the effectiveness of coatings obtained in the present process may be assisted by the ability of solutions of the selected non-reducing oligomeric saccharides to spread easily across the surface of the percarbonate and thereby create a barrier or layer from even small amounts of coating agent that prevents or reduces interaction between the percarbonate core and the environment, be it water vapor in the local atmosphere and/or other particulate materials in for example detergent compositions in which percarbonate is incorporated as a bleach. However, easy spreadability of a solution of the coating agent in practice is believed to contribute only a part of the overall explanation as to how or why the selected coatings are so effective, because other sugars such as lactose are likewise capable of spreading across the surface, but do not exhibit the same performance.

The non-reducing oligomeric saccharide is preferably a disaccharide, and particularly sucrose. It will be recognized that as employed herein, a reference to sucrose includes the molecule itself and any polymeric derivatives that are derivable during processes for applying a coating to percarbonate. For example, during some processes for applying a coating and in most processes for drying a coated percarbonate, it is normal practice to contact the percarbonate particles with a hot gas, which may encourage polymerization. For the avoidance of doubt, the derivatives of sucrose, if any, that arise during such coating or drying processes are encompassed within the instant invention.

It will be recognized that the term oligomeric saccharide excludes starch and like extremely high molecular weight materials.

The sucrose or other non-reducing oligomeric saccharide need not constitute all the coating agent. Indeed, it is preferable for the coating agent to further comprise at least one co-coating agent which can be a salt of a carboxylic or organophosphonic acid, but which advantageously is an inorganic salt. The salt may be employed as such or in the instance of for example carboxylic acids can be incorporated in the solution employed for coating as the corresponding acid which is neutralized by contact with the percarbonate during the coating process. By so employing a co-agent, it is possible either to increase the total coating level without increasing the amount of sucrose or other non-reducing oligomeric saccharide that is coated onto the percarbonate or to achieve the same total weight of coating but with a smaller proportion of sucrose or other non-reducing oligomeric saccharide. In some preferred embodiments of the present invention, the non-reducing oligomeric saccharide provides a minor fraction of the total weight of coating agent.

It will also be understood that although oligomeric saccharides can be employed in a small amount as a coating agent on an oxidizing agent such as sodium percarbonate safely, ie as demonstrated by low heat emission in a standard test, the use of significantly larger amounts result in much greater heat emission which demonstrates that the product is much less safe than uncoated material. Accordingly, it is of practical significance that the proportion of sucrose or other non-reducing oligomeric saccharide employed in the present invention be severely restricted. The potential oxidative interaction between sodium percarbonate and a oligomeric saccharide accordingly represents a major difference between sodium percarbonate and other detergent ingredients like zeolites as such or bearing absorbed additives which do not undergo such oxidative interactions It has been observed that in at least some methods of applying a coating containing the non-reducing oligomeric saccharide, for example in solution onto a bed of percarbonate particles, there is a growing tendency for the resultant product to contain agglomerates as the weight proportion of the non-reducing oligomeric saccharide is increased above about 2%. This tendency can be ameliorated by employing a co-coating agent as described herein, and in any event, the agglomerates can be disintegrated into constituent particles by gentle pressure, ie pressure that is significantly below that at which compaction would be carried out. It is a process advantage to avoid use of additional processing steps, so that it is distinctly desirable to employ a co-coating agent and indeed. desirable to employ a mixture of the coating agents instead of separate additions where more than one agent is used, though the latter method remains viable, particularly if the additions occur simultaneously onto an agitated bed of particles.

The co-coating agent is often selected from inorganic salts, preferably alkali metal or alkaline earth metal salts and more preferably an alkali or alkaline earth metal carbonate, sequicarbonate or silicate or salt of a mineral acid, such as chloride, sulphate or phosphate. Within the term silicates are encompassed materials which suitable obey the formula $M_2O.nSiO_2$ in which M represents an alkali metal preferably sodium or ammonium, and n is selected in the range of from 0.5 to 4. Within the term phosphate, there are encompassed ortho, pyro and metaphosphates or mixtures thereof. Preferred selections of inorganic salts for employment in combination with the non-reducing oligomeric saccharide include carbonate, carbonate/chloride, carbonate/sulphate carbonate/chloride/sulphate, sulphate, sulphate chloride and either silicate or any of the foregoing combinations together with silicate. The weight ratio of carbonate to respectively chloride or sulphate and sulphate to chloride is often chosen in the range of from 10:1 to 1:10 in such combinations. When silicate is present, it often comprises from 2 to 15% of the inorganic salts.

In many preferred embodiments of the present invention, the coating applied to the percarbonate comprises from 5 to 80 parts by of a non-reducing oligomeric saccharide, particularly sucrose together with respectively 95 to 20 parts by weight in total of one or more inorganic salts selected from an alkali metal carbonate, sequicarbonate, silicate-chloride, sulphate or phosphate, and especially from 10 to 60 parts by weight of the non-reducing oligomeric saccharide together with 90 to 40 parts by weight of said selected inorganic salt(s). More desirably, the inorganic-salts or combinations thereof are selected from the preferred selections listed above.

Especially desirable combinations of coating agents according to the present invention comprise from 15 to 50 parts by weight of sucrose in conjunction with 85 to 50 parts by weight of sulphate or silicate.

Instead of all or part of the inorganic salts, it is possible to employ a salt and especially an alkali metal salt such as sodium or magnesium of a carboxylic acid or hydroxycarboxylic acid. Suitable salts include tartrate, citrate, succinate, glutarate adipate and ascorbate, and preferably the sodium, potassium or magnesium salts thereof Mixtures of such salts can be used, as for example mixtures of succinate, glutarate and adipate.

It is highly desirable to select as co-coating agents those which are readily water soluble in the range of ambient temperature to mildly elevated, such as from about 10° C. to 40° C. or 60° C., which encompasses temperatures usually encountered in cold steeping and low temperature machine washing or hand-washing laundry processes or in cleansing of hard surfaces. Such co-coating agents include alkali metal sulphates, chlorides, phosphates and low molecular weight carboxylates like tartrate, adipate or succinate. The choice of a soluble coagent with sucrose or other oligomeric saccharide enables rapid dissolution of the percarbonate in use.

The coating agent or combination of coating agents of the present invention is advantageously employed in the form of an aqueous solution. In practice, the concentration of the coating agent, ie the total of the non-reducing oligomeric saccharide and any co-coating agent, in the aqueous coating solution is at least half of, and preferably as close as is convenient to, its saturation concentration of the solution at the application temperature. In this way, only a comparatively small and preferably at or near the smallest practicable quantity of water needs to be evaporated subsequently to produce dry percarbonate particles, thereby requiring a lesser or least heat input during the drying stage, but retaining the advantage of applying the coating agent in a solution which can spread across the surface of the percarbonate. The concentration of coating agent in the aqueous coating solution is generally at least 15% by weight, preferably at least 20% by weight. Concentrations above or equal to approximately 25% by weight are particularly advantageous and in many instances, the coating agents are sufficiently soluble that solutions containing between 30 and 35% by weight solute in 70 to 65% by weight water can be employed at a solution temperature in the region of 30 to 50° C. In some combinations, such as with soluble silicates it is possible even to employ coating solutions containing from 35 to 43% by weight coating agent and the balance water (65 to 57%) at such temperatures. It will be recognized that the coating agent solutions contemplated herein remain free flowing at application temperatures, particularly when a mixture of non-reducing oligomeric saccharide and co-coating agent is employed, thereby assisting the percarbonate particles to absorb at least a fraction of the solution during the process of applying the coating agent and to assist in the rate of spreading of the solution across their surfaces. Such freeflowing capability of the solution, the excellent water solubility of the coating agent or agents and also using a mixture of agents each reduce a risk that oligomeric saccharide dust could be formed inadvertently in contact or in close proximity to a ready source of oxygen.

The dissolution of the coating agent or its constituents can take place conveniently at a temperature of from 15 to 95° C., and preferably from 20 to 70° C.

It will be recognized that it is not necessary for all the coating agent constituents to be dissolved in a single solution, and that each constituent or a sub-combination can be introduced separately, though such separate employment would tend to increase the amount of solution needed per weight unit of coating agent.

It will also be recognized that a slurry of the coating agents can be employed instead of a solution, for example a suspension of particulate inorganic salt in a solution of the sucrose or other non-reducing oligomeric saccharide. This would enable a relatively large weight of coating to be applied in a single pass, but in practice usually requires small particulates of mean size below 100 microns to be processed.

The total quantity of coating agent used, including both non-reducing oligomeric saccharide, particularly sucrose, and any co-coating agents, usually represents 0.5 to 20% w/w of the coated percabonate Preferably, the total quantity is selected in the range of from 1 to 15% w/w and in many instances from 2 to 10% of the coated percarbonate. In many practical embodiments, the total weight of coating agent is selected in the range of from 2 to 5%. The weight of sucrose or other non-reducing oligomeric saccharide is not more than 5%, is usually selected within the range of from 0.2 to 3%, in many instances from 0.5 to 2.5% and in a number of favoured instances in the range of from 1% to 2% with the balance of total coating agents weight being supplied by appropriate amounts of co-coating agent or agents, and in particular inorganic agents such as those indicated herein. The co-coating agent or mixture of them, it will be seen, often provides a weight of from 0.5 to 6% of coating based on the weight of the coated material, and in many instances from 1 to 3%.

As a general indication, when a coating agent is applied by the same method, the extent to which percarbonate decomposition is ameliorated increases as the thickness of the coat increases, though non-linearly. The selected weight of coating takes into account the manner of coating, the length of the period for which the resultant composition should remain stable, the environment in which the percarbonate will be used, such as the temperature and humidity of storage conditions and the proportion of relatively aggressive washing composition constituents like zeolites, and the extent to which purchasers of the product will tolerate a reduction in the available oxygen (Avox) content of the percarbonate.

The alkali metal percarbonate is preferably sodium percarbonate. In many of the coated percarbonate products produced according to the present invention, the bulk density of the percarbonate so coated is selected in the range of 0.8 to 1.2 kg/l. The rate of dissolution of percarbonate that has been so coated is often acceptably rapid, when determined according to a method adapted from international standard ISO 3123-1976. The time corresponding to a 90% dissolution of the sample of percarbonate coated according to the invention does generally not exceed 2.5 minutes. The 90% dissolution time is the time taken for conductivity to achieve 90% of its final value after addition of coated sodium percarbonate to water at 15° C. and 2 g/l concentration. The method used is adapted from ISO 3123-1976 for industrial perborates, the only differences being the stirrer height that is 1 mm from the beaker bottom and a 2 liter beaker (internal height 183 mm, internal diameter 127 mm).

The particulate percarbonate that is suitable for coating in any process according to the present invention can have been prepared in any process known as such for making an alkali metal percarbonate, e.g. by the direct method, by fluid bed processes, or the so called wet processes in which percarbonate is crystallized from a saturated aqueous solutions, often by cooling and/or by optional addition of an alkali metal salt.

Advantageously, in a number of embodiments it is desirable to employ as feedstock a percarbonate that does not contain a significant proportion, ie contains not more than 1% w/w of a halide such as chloride. By selecting such a feedstock, obtainable from a suitably controlled and operated fluidized bed or "wet bed" process, it is possible to obtain a particularly beneficial combination of properties, part from the selected coating agent and part from the feedstock so as to achieve the best result overall.

The percarbonate core particles which are coated by a process according to the present invention can incorporate various additives in a wide range of proportions and in accordance with known teachings and/or practice. Such additives include, amongst others persalt stabilizers, crystal habit modifiers and salting out agents.

Persalt stabilizers can be selected from one or more of alkali metal and alkaline earth metal silicates, alkali metal and alkaline earth phosphates, magnesium compounds such as magnesium sulphate, chloride or oxide, organic complexing carboxylic acids and their salts, such as ethylene diamine tetraacetic acid and/or salt, or diethylenetriaminepentaacetic acid and/or salt and/or organic polyphosphonate complexing agents such as hydroxyethylidenediphosphonate, and alkyl eneaminopolymethylenephosphonates, including ethylenediaminetetramethylene phosphonic acid and/or salt, diethylenetriaminepentamethylenephosphonic acid and/or salt, cyclohexane-1,2-diaminetetramethylenephosphonic acid and/or salt.

In some highly desirable embodiments, the process of the present invention is employed to coat sodium percarbonate which contains a small amount of up to about 0.5% w/w silicate distributed within its particles and optionally a further small amount of up to about 0.5% of a silicate or silicate derivative on the surface of its particles, as a result of the timing and distribution of the addition of silicate in two stages during the crystallization and recovery of the particulate percarbonate, for example product that has been produced by a manufacturing/stabilising process described either in GB-A-1 553 505, published in the name of Interox Chemicals Limited or in GB-A-1 578 062, published in the name of Peroxid-Chemie GmbH Crystal habit modifiers act on the morphology of the percarbonate crystals and include organic polymeric compounds like polyacrylates and inorganic species such as polyphosphates eg sodium hexametaphosphate.

It will be understood that some agents can simultaneously provide a number of different properties, such as stabilization and crystal habit modification.

Salting out agents have conventionally been used in commercial processes that have been employed in the last 60 years for the crystallization of the percarbonate from solution, and typically are highly water-soluble alkali metal salts, such as sodium chloride, sodium sulphate, or sodium hexametaphosphate. Alternatively, the percarbonate can be produced in a crystallisation process which does not employ a noncarbonate salting out agent, but takes advantage of the relative insolubility of sodium percarbonate compared with sodium carbonate in alkaline conditions and at temperatures in the region of about 10 to 25° C.

In some embodiments, the nature of a co-coating agent for percarbonate is selected to match or complement the salting out agent if any, that is employed during its manufacture in a crystallisation process. Thus, if the sodium percarbonate is made with a chloride salting-out agent, it is often convenient to employ a coating which contains sucrose plus chloride or chloride/carbonate. On the other hand, if a chloride-free crystallisation process is used, it is convenient to employ a coating which itself does not contain chloride or more than a very minor fraction of chloride providing no more than about 0.3% chloride on the percarbonate.

The mean diameter of the percarbonate core particles that are coated by a process according to the present invention is at the discretion of the user. The mean diameter is normally at least 100 μm and often not greater than 2000 μm, and in many instances, the mean particle size (MPS) falls in the range of 250 to 1000 μm. However, it is particularly desirable to employ percarbonate having an MPS in the region of from about 500 to 850 μm. In a number of advantageous embodiments of the present invention there is provided coated percarboate having an MPS of at least 600 μm and preferably from about 700 to 850 μm.

The spread of percarbonate particles is at the discretion of the percarbonate producer, but as a practical matter, and as has been realized for many years, it is advantageous for incorporation in particulate detergent compositions for the percarbonate to avoid very fine particles, such as particles of below about 100 or 150 μm, because such particles are inherently more susceptible to environment-induced decomposition—they present a much higher surface area to volume ratio than larger particles and they therefore find it easier and quicker to absorb moisture from the surrounding air. For many particulate detergent compositions, it is also desirable to avoid or minimize particles larger than about 1500 μm, to reduce potential problems of persalt/detergent particle segregation. Thus, in many practical embodiments of the present invention, all or substantially all the percarbonate to be coated can pass through a sieve of 1500 μm and be retained on a sieve of 150 μm, and in at least some preferred. embodiments, at least 80% w/w of the percarbonate is retained on a sieve of 350 μm and passes through a sieve of 1200 μm, desirably having an MPS of at least 600 μm and most desirably from 700 to 850 μm. In the context of its definition in EP 451893, the percarbonate products having an MPS of over 600 μm and at least 80% by weight between 350 and 1200 μm have a morphology index of below 0.03, and when coated in accordance with the instant invention, yet still demonstrate an excellent rate of solubility, excellent in wash performance and excellent in pack stability.

The process according to the present invention by which percarbonate particles are coated with the coating agent described above can comprise any method known in itself for contacting persalts with coating agent. A preferred means for bringing the coating agent into contact with the percarbonate comprises spraying an aqueous solution of the coating agent onto the percarbonate particles. It is particularly desirable for the percarbonate particles to be kept in motion. Thus, a coating process of the present invention can desirably be carried out in a range of apparatuses that can agitate particles, of which practical examples include a fluid bed, a rotating plate, and a rotary mixer into each of which it is convenient to spray the coating agent solution. During the course of the contact, the persalt tends to adsorb, and to some extent absorb the coating agent solution and with simultaneous or subsequent evaporation of the solvent from the coating agent solution, a coating is deposited around the percarbonate core.

It will be recognized that the invention coating process may be conducted in a single pass through the coating apparatus or in a plurality of passes, at the discretion of the user. A plurality of passes is particularly beneficial for application of a heavy coating in that it reduces the amount of solvent that need be removed in each pass and thus reduces or removes the risk of over-wetting the percarbonate before it is dried. A continuous or batch method can be used.

Contact of the coating agent solution with the percarbonate can be carried out at the same time and in the same vessel as evaporation of solvent from the solution and formation of the coating layer. The two steps can alternatively be carried out separately in different apparatus, which may in some cases be of the same type, eg both in fluidized beds or be of different types, such as the mixing step in a rotary mixer and the evaporation step in a fluidized bed.

An apparatus such as a fluid bed is particularly suitable for carrying out simultaneous spraying and evaporation. In such an operation, the temperature of the fluid bed is usually maintained in the range of 30 to 95° C. and preferably 60 to 80° C.

One particularly advantageous process variation comprises contacting a charge of the percarbonate particles with a solution of the invention coating agent in a separate mixer, particularly a rotary mixer, and drying the wetted percarbonate subsequently in a fluid bed. The solution can be introduced into the mixer by spraying or even via a coarse spray such as one or more nozzles. In this separate mixer variation, the temperature in the mixer is often selected in the range of 10 to 60° C. and preferably 20 to 50° C. The advantage of employing a solution containing sucrose is that it is able to spread readily across the percarbonate particle surfaces within the mixer. Drying in the fluid bed is then often carried out at a temperature of 50 to 90° C. and preferably of from 60 to 70° C.

The fluid bed employed herein either for a combined coating/drying process or simply in the drying stage can be operated in accordance with known procedures for coating/drying or simply drying persalts, as the case may be. Thus, any non-reactive gas can be used as the fluidizing gas, including air in particular. The gas can be pre-dehumidified, if desired, and pre-heated to maintain the temperature of the fluid bed at the desired value. It is also possible to use direct heating means for the fluidized bed, such as a tube bundle placed within the fluid bed or a heated jacket around the bed. The upward airflow of fluidizing gas is regulated to maintain the percarbonate particles in an agitated state, ie not settling, but is not so great as to blow the particles, other than fines, out of the fluidizing vessel.

The aqueous coating solution and the percarbonate particles are generally brought into contact at a temperature within about 30° C. of each other and preferably within about 5° C. of each other.

The proportions of coating agent solution and percarbonate are chosen so as to leave, after drying, the desired weight of coating agent around the percarbonate core. In practice, it is desirable to limit the addition of solution to percarbonate in a fluid bed or mixer to a maximum water content of about 15% w/w so as to minimize or eliminate wetting out problems, more preferably to an amount selected in the range of about 3 to 12% w/w water and often from, about 6 to 12% w/w water. It is normally desirable also to continue drying until the coated percarbonate has a moisture content of below about 1% w/w; such as in the region of 0.1 to 0.7% w/w. The duration of the drying stage is usually determined by such practical considerations as, amongst others, the amount of coating agent solution being applied per unit weight of percarbonate, the residual content of moisture that will be tolerated; the temperature and moisture content of the influent fluidizing gas, whether additional heating is employed for the bed and the rate at which the gas flows through the bed. It will accordingly vary from apparatus to apparatus and be capable of control by a skilled person in the art of coating persalts with the aid of preliminary ranging trials.

It will naturally be recognized that the final form of a coating agent on percarbonate may change as a result of subsequent reaction or processing. Thus, for example, contact of a solution of an acidic coating agent on the surface or in the surface layer of percarbonate of an alkali, may result in the interaction of the acid with the alkali, and the drying stage can release water of hydration from some or all hydrated salts that might be expected to be present at ambient temperature, provided that the drying temperature exceeds the transition temperature for such salts.

It will be seen that the present invention also provides coated alkali metal and especially sodium percarbonate having advantageous properties. In some embodiments, by suitable selection of the coating agent and nature of the core percarbonate, the invention provides coated sodium percarbonate having 90% solubility in the solubility test hereinafter described within 1.7 minutes and an Avox retention of at least 64% and preferably at least 70% after 6 weeks storage in the stability test hereinafter described (set A). Such advantageous coated percarbonate is obtainable by coating percarbonate with a non-reducing oligomeric saccharide and optionally with a co-coating agent.

In preferred embodiments, the above identified combination of coating properties, namely rapid solubility and excellent storage stability is achieved with a coating that represents 2 to 5% by weight of the coated product. This is especially advantageous, in that the benefit of excellent stability is achieved with the application of only a small weight of coating agent. This is not only a cost advantage when compared with employing a larger amount of coating agent, but it also minimizes the inevitable reduction in Avox content of the coated percarbonate compared with the uncoated, feedstock percarbonate. By doing so, it is possible to achieve in a number of preferred embodiments the benefits of high stability and rapid solubility whilst retaining an Avox of above 12.5% w/w, particularly above 13.5% and especially above 14%, depending naturally upon the Avox of the feedstock uncoated percarbonate.

Furthermore, in at least some of the particularly useful embodiments, the coated percarbonate having the desirable combination of solubility and stability properties has a mean particle size of from 600 to 850 $\mu$m and preferably at least 700 $\mu$m. Such a mean particle size reduces the likelihood of particle segregation of the percarbonate from other constituents of compact or ultra-compact or granulated "conventional" detergent compositions. Advantageously, therefore, the combination is achieved of large particle size with small amount of coating to obtain excellent in pack stability and rapid dissolution.

Advantageously, it has been found that a number of preferred coated percarbonates according to the present invention have a heat emission at 40° C. of below 4 $\mu$W/g and preferably below 1.5 $\mu$W/g in the beat emission test hereinafter described.

The present invention also relates to washing or bleaching compositions containing particulate coated sodium percarbonate, such as product according to the present invention described hereinabove and/or produced by the process according to the present invention hereinabove.

In many preferred washing compositions according to the present invention intended primarily for laundry washing, one or more of the composition components are selected within the following narrower bands:

percarbonate 2 to 40%, particularly 5 to 30%
surfactant 2 to 40%, particularly 5 to 25%
builder 1 to 60%, particularly 5 to 40%
diluent 1 to 70%, particularly 5 to 50%
additives 1 to 10% in total.

In many related bleach preparations, often intended for use in conjunction with detergent compositions containing little or no bleach, or as a bleach supplement to bleach containing compositions, such bleach preparations contain percarbonate 5 to 90%, particularly 20 to 50%
surfactant 0 to 20%, particularly 0.5 to 5%
builder 1 to 95%, particularly 30 to 80%
diluent 1 to 95%, particularly 30 to 80%
additives 0 to 20% in total, preferably 1 to 10%.

The surfactants for incorporation in solid laundry or bleach compositions of the present invention can be selected from particulate or flaky anionic, cationic, non-ionic, zwitterionic, amphoteric and ampholytic surfactants and can be either natural or synthetic soaps. A number of suitable surfactants are described in chapter 2 of Synthetic Detergents by A Davidsohn and B M Milwidsky (6th edition) published in 1978 by George Godwin Ltd and John Wiley & Sons, incorporated herein by reference. Without limiting to these surfactants, representative sub-classes of anionic surfactants are carboxylic acid soaps, alkyl aryl sulphonates, olefin sulphonates, linear alkane sulphonates, hydroxyalkane sulphonates, long chain and OXO alcohol sulphates, sulphated glycerides, sulphated ethers, sulpho-succinates, alkane sulphonates, phosphate esters, sucrose esters and anionic fluorosurfactants; representative classes of cationic surfactants include quaternary ammonium or quaternary pyridinium salts containing at least one hydrophobic alkyl or aralkyl group; representative classes of nonionic surfactants include condensates of a long chain alkanol with either polyethylene oxides or with phenols, or condensates of long chain carboxylic acids or amines or amides with polyethylene oxide, and related compounds in which the long chain moiety is condensed with an aliphatic polyol such as sorbitol or condensation products of ethylene and propylene oxides or fatty acid alkanolamides, polyalkylglucolides, glucosamides and fatty acid amine oxides; representative classes of amphoteric/zwitterionic surfactants include sulphonium and phophonium surfactants, optionally substituted by an anionic solubilising group. The proportion of surfactant, expressed as a fraction of all the surfactant present is often from $2/10$ to $8/10$ths anionic, from 0 to $9/10$ths non-ionic, and from 0 to $3/10$ths for the other surfactants.

Detergent builders that are suitable for inclusion in compositions according to the present invention include specifically alkali metal phosphates, particularly tripolyphosphate but also tetrapyrophosphate and hexametaphosphate, especially the sodium salt of each, alkali metal, (preferably sodium) carbonates, alkali metal, (preferably sodium) borates, and siliceous builders including clays like bentonite, zeolites such as A, X, Y, AX and MAP zeolites (EP-A-O 552 053) and layered silicates such as the product available under the trade designation SKS6. The coatings achievable with the sucrose or like containing coating agents of the present invention render sodium percarbonate that has been so coated at higher levels particularly suited to incorporation in the relative aggressive detergent compositions, ie those containing aluminosiliceous builders. Mixtures of the zeolite builders either with each other and/or with other siliceous and/or phosphate and or carbonate and/or clay builders can be employed in the instant invention compositions. Useful detergent compositions can also include organic chelating builders as nitrilotrisodium triacetate (NTA), EDTA, EDTMP and DTPMP. Such chelating builders can be employed in a relatively small amount as an augmenting builder and peroxygen stabilizer, such as of 1 to 10%.

The detergent compositionscan also contain diluents, in an amount usually of not more than about 50% w/w. Such diluents include sodium and magnesium sulphate and are less favoured than previously by manufacturers of detergent compositions, who in recent years have promoted concentrated compositions and compositions having a higher bulk density.

Detergent compositions of the present invention can also contain other substances selected for dedicated purposes in detergent compositions, which in some instances are referred to collectively as detergent additives. Among such additives, the following can be mentioned: persalt activators, optical brighteners, foam inhibitors, enzymes, fading inhibitors and antiredeposition agents, colorants, pH regulators. Such aciditives for incorporation in persalt-containing detergent compositions have been described in greater detail in Chapter 4 and exemplified in Chapter 7 of the aforementioned work by Davidsohn and Mildwisky and are well known to skilled practitioners. Thus, for example, the bleach activator is typically a compound which generates a peroxyacid or an anion thereof by reaction with the percarbonate and is employed in a mole ratio of about 4:1 to 1:2 percarbonate: activator for monoactivating activators and proportionately for multi-activating activators. Peroxyacid-generating activators are usually N-acyl or O-acyl compounds and a peracid, often peracetic through to pernonanoic acid is generated by interaction between the compound and a perhydroxyl anion liberated from the percarbonate on its dissolution. Activators have become regular constituents of washing compositions intended for machine washing at low temperatures. A non-exhaustive range of activators a1 to a20 described below can be employed herein.

(a1) carboxylic acid or mixed carboxylic acid/sulphonic acid anhydrides such as benzoic anhydride, phthalic anhydride, bis(ethane sulphonic) acid, anhydride and benzene sulphonic acid/benzoic acid anhydride.

(a2) enol esters such as vinyl or isopropenyl acetate or benzoate or divinyl adipate.

(a3) gem diesters such as ethylidene or isopropylidene diacetate or dibenzoate, or ethylidene benzoate acetate or heptanoate, or bis(ethylidene acetate) adipate or azelate.

(a4) sugar esters such as glucose pentacetate or lactose octacetate.

(a5) carbonic acid esters such as alkali metal salts of para(ethoxycarbonyloxy) benzoic acid or para (propyloxy carbonyloxy) benzene sulphonic acid.

(a6) N,N-diacylated amines, such as N,N,N'N'-tetraacetyl (methylene or ethylene) diamine, N,N-diacetylaniline, N,N-diacetylmethylamine or N,N-diacetyl-p-toluidine.

(a7) Diacyiated hydantoins such as 1,3-diacetyl-5,5-dimethylhydantoin.

(a8) Acylated glycolurils, such as tetraacetylglycoluril.

(a9) N-alkyl-N-sulphonylcarbonamides, such as the compounds N-methyl-N-mesylacetamide, N-methyl-N-mesyl-henzamide, N-methyl-N-mesyl-nitrobenzamide, and N-methyl-N-mesyl-p-methoxybenzamide.

(a10) N-acylated cyclic hydrazides, acylated thiazoles or urazoles, such as monoacetylmaleic acid hydrazide.

(a11) Diacylated 2,5-diketopiperazines, such as 1,4-diacetyl-2,5-diketopiperazine, 1,4-dipropionyl-2,5-diketopiperazine and 1,4-dipropionyl-3,6-dimethyl-2, 5-diketopiperazine.

(a12) Acylation products of propylenediurea or 2,2-dimethylpropylenediurea (2,4,6,8-tetraaza-bicyclo-(3, 3,1)-nonane-3,7-dione, or its 9,9-dimethyl derivative, especially the tetraacetyl- or the tetrapropionylpropylenediurea or their dimethyl derivatives.

(a13) O,N,N-trisubstituted hydroxylamines, such as O-benzoyl-N,N-succinyl-hydroxylamine, O-acetyl-N, N-succinyl-hydroxylamine, O-acetyl-N,N-phthaloyl-hydroxylamine, O-p-methoxybenzoyl-N,N-succinyl-hydroxylamine, O-p-nitrobenzoyl-N,N-succinyl-hydroxylamine and O,N,N-triacetylhydroxylamine.

(a14) N,N'-diacyl-sulphurylamides, such as N,N'-dimethyl-N,N'-diacetyl-sulphurylamide and N,N'-diethyl-N,N'-dipropionyl-sulphurylamide.

(a15) Sulphonyl halides such as p-(acetyl amino) phenyl sulphonvl chloride.

(a16) Azines such as diisocyanato-s-triazine or a halotriazine.

(a17) N-Sulphonylazoles.

(a18) N-acyl carboxylic imides such as N-acetyl caprolactam, N-acetyl diglycolimide, N-acetyl succinimide and N-acetyl phthalimide.

(a19) Mixed O-acyl, N-acyl compounds such as alpha-acetoxy-alpha-methyl-N,N'-diacetoxymalonamide or O-acetyl-N,N-diacetylethanolamine.

(a20) Salts of benzenesulphonic acid esters of carboxylic acids such as sodium nonanoyloxybenzenesulphonate, sodium benzoyloxybenzenesulphonate or sodium isononanoyloxybenzenesulphonate.

The preferred activators include TAED, SNOBS, sodium isononoyloxybenzene sulphonate, TAGU and sugar esters. The weight ratio of percarbonate to activator is often from 1:1 to 10:1.

Another type of activator for washing/bleaching compositions comprises certain transition metal salts and/or complexes, for example certain manganese, cobalt, and titanium complexes, sometimes employed in conjunction with a calcium promoter, as described in European Patent Application-A-0 272 030. Commonly used optical brighteners include stilbene derivatives. Common antiredeposition agents include carboxymethyl cellulose and polyvinyl pyrrolidone.

The washing and/or bleaching compositions can be employed for washing and or bleaching operations, such as for washing domestic laundry by hand or using machines employing either top loading or front loading, and using either long or short ratios of liquor to laundry. Such machines can be operated in accordance with currently described operation conditions for respectively persalt or persalt plus activator containing compositions, including washing at cold soak temperatures, eg from about 10 to 30° C., low temperature operation at from 30 to 60° C. (both of which preferably with bleach activator) or at high temperatures eg of about 60° C. up to boil wash. The detergent compositions can be dispensed in accordance with instructions on the container, such as direct dispensing into the wash solution for hand washing, or into the laundry before wetting for machine washing, or via a dispensing tray through which wash water is flushed or from a dispensing ball or sachet placed within the laundry.

By virtue of the excellent solubility of the invention coated percarbonate in aqueous wash solutions, and its excellent pack stability, and especially of the best combinations tested, the invention coated percarbonate not only enables excellent stain removal of bleachable stains to be effected, but it enables such performance to be retained to a substantial extent during a long period of time whilst the detergent is distributed, purchased by the eventual end user and stored by the user.

In further variations on compositions containing percarbonate according to the instant invention, the compositions are employed for washing dishes. Such dishwasher compositions often comprise by weight:

percarbonate 2 to 30%, particularly 5 to 20%
surfactant 0.5 to 30%, particularly 1 to 25%
builder 1 to 80%, particularly 10 to 60%
additives 1 to 50% in total, preferably 5 to 30%.

In the dishwasher compositions, the surfictants are often selected from ranges of surfactants contemplated for laundry formulations; but in an amount and with a preference for low foaming surfactants and/or the addition of sufficient foam suppressers to control to a minimum the extent of foaming within the dishwasher.

In the dishwasher compositions, the builders are normally selected from water soluble builders such as polycarboxylates, phosphates, silicates, carbonates and phosphonates such as those which have been described herein briefly for laundry detergents. Polycarboxylates are amongst the especially favoured builders. They can comprise acyclic, alicyclic aromatic or heterocylic carboxylic acids. Useful polycarboxylates are often monomeric or oligomeric and can comprise, amongst others, dicarboxylic acids, tricarboxylic acids and tetracarboxylic acids. They can also be hydroxy-substituted. Suitable polycarboxylates can include aliphatic C4 to C6 $\alpha$-$\omega$ dicarboxylates, optionally unsaturated, citrates, citraconates, carboxymethyloxysuccinates, oxypolycarboxylates, ethane or propane tetacarboxylates and mellitate or pyromellitate. Other suitable polycarboxylates include tetracarboxylate derivatives of cyclopentadiene or tetrahydrofuran, polycarboxylate derivatives of hexane and carboxymethyl derivatives polyhydric alcohols, eg mannitol, xylitol or sorbitol.

The builder can desirably contain a small proportion (0.1 to 2%) of complexing builders such as polyphosphonates, eg hydroxyethanediphosphonate or polymethylenephosphonate derivatives of amines or polyamines such as ethylenediamine tetramethylene phosphonate or cyclohexane-1,2-tetramethylene phosphonate or diethylenetriamine pentamethylene phosphonate, as such or in acid form.

Amongst the additives, it is preferable to employ a bleach activator, such as a1) to a20) described hereinabove in the ratio to percarbonate and weight proportions in the composition described for laundry compositions. It is of practical benefit to employ a corrosion inhibitor in an amount of up to about 5%, preferably in addition to the various phosphate builders which may also be present and which can inhibit corrosion to a certain extent. Such additional corrosion inhibitors include benzotriazole and its derivatives, aromatic mercarptans and diols including lauryl mercaptan thiophenol, thionapthol, thioanthranol and thionalide. Other types of corrosion inhibitor include fatty carboxylic acids and their hydroxy-substituted counterparts, as such or as a watersoluble salt, hydroxyaromatic antioxidants and paraffin oils, preferably with molecular weight of about 350 to 600.

A further additive which can be present comprises an acidifier, preferably in an amount of 0.1 to 30% and particularly from 1 to 25%. The acidifier is often conveniently capable of acting as a builder when introduced into solution and is thus a carboxylic acid variation of the aforementioned carboxylate builders. Other suitable acidifiers include water soluble monocarboxylic acids such as lactic acid. It is preferable for the acidifier to be coated so as to delay release of the acidifier until a significant fraction of bleach activator has reacted with the percarbonate, generating the more active peracid species. Suitable coatings are often from about 3 to 10% by weight of poorly water-soluble compounds selected from hydrocarbon waxes, hydrogenated vegetable oils, fatty acids, amide derivatives or glycerides.

Coatings with a softening point around 40–50° C. are often of interest.

Dishwasher compositions containing the invention coated percarbonate are normally provided in the form of granules or tablets obtained by conventional granulation of the powders preferably adding a percarbonate granule to preformed granules of the remaining detergent constituents or by compressing the constituents in a conventional method in a mould preferably in the presence of a typical tablet lubricant.

Processes for washing in automatic dishwashers are often conducted at a temperature in the region of about 40 to 70° C.

Certain embodiments of the present invention are described hereinafter in greater detail by way of example only.

In the Examples and Comparisons except where specifically indicated coated sodium percarbonate was obtained by the following general process and tested where indicated by the following test procedures.

Coating Process P1

A solution of defined coating agent constituent(s) was prepared by stirring a specified weight of the (or each) constituent in a specified weight of demineralised water and heating to approximately 40° C. if necessary until a clear solution without suspended solids was apparent to an experienced eye. A specified feedstock of particulate sodium percarbonate usually 1 kg was placed in a Lödige M5R™ mixer at laboratory ambient temperature and sufficientsolution was poured slowly onto the agitated particles to add the specified weight of coating agent. The agitation was continued for a further 2–3 minutes to transfer the solution substantially evenly across the bed of particles. The resultant damp particles were transferred into a laboratory scale (Aeromatic™ STREA 1) fluid bed drier in which they were fluidized and dried by an updraft of hot dry air having a temperature at inlet of approximately 70° C.–85° C. and maintaining a bed temperature of 65–75° C. for approximately 30 minutes. The particles were thereafter cooled briefly by an updraft of cool air to a bed temperature of about 40° C. and were then available for a series of tests to determine the properties of the coated products.

Feedstock Percarbonate Particles

F1 A feedstock obtained from a continuous wet process for precipitating percarbonate from aqueous solution in the presence of a chloride salting-out agent and having mean particle size of 764 μm Avox of 13.2% and bulk density of 1.00.

F2 A second feedstock obtained from a continuous wet process for precipitating percarbonate from aqueous solution in the presence of a chloride salting-out agent and having mean particle size of 516 μm, and Avox of 13.65%.

F3 A third feedstock obtained from a continuous wet process for precipitating percarbonate from aqueous solution in the presence of a chloride salting-out agent and mean particle size of 489 μm, Avox of 13.8% and bulk density of 1.01.

F4 A fourth feedstock obtained from a continuous wet process for precipitating percarbonate from aqueous solution in the presence of a chloride salting-out agent and having mean particle size of 465 μm, Avox of 14.2% and bulk density of 0.99.

F5 feedstock obtained from a continuous wet process for precipitating percarbonate from aqueous solution in the absence of a chloride salting-out agent having an Avox of 14.7%, mean particle size of 765 μm and bulk density of 0.97.

F6 A feedstock obtained from a continuous wet process, or precipitating percarbonate from aqueous solution in the absence of a chloride salting-out agent having an Avox of 14.8%, mean particle size of 751 μm and bulk density of 1.04.

Particle Size Measurement

The particle size distribution was obtained by sieving the material through a nest of 9 sieves with apertures ranging from 1400 down to 75 μm. From the weight retained on each sieve, the weight fraction was determined, and from the distribution, the mean particle size was calculated.

Bulk Density

The free flowing bulk density of the products was measured placing a sample in a cone of depth 60 mm, with top diameter 53 mm and base diameter 21 mm, the base being at a height of 20 cm above a work surface and allowed to flow under gravity into a collecting vessel on the work surface. The contents of the vessel are carefully leveled off by horizontal passage of a blade and weighed. The density is determined by comparison with the known volume of the vessel.

Solubility

The solubility of the products listed in the Tables herein was determined according to the method adapted from international standard ISO 3123-1976 reported herein, by mixing the particulate product (2 g) with demineralised water (1000 g) maintained at 15° C. and the electrical conductivity of the aqueous phase was monitored. Dissolution of the percarbonate resulted in an increase in conductivity, and the time taken to reach 90% of the maximum change was recorded in order to show how fast or slow the products would dissolve. This is the test by which the solubility of the claimed products herein is judged.

Moisture Pick-up (32/80)

A 9 cm diameter petri dish with a 1 cm depth rim is weighed accurately on a 4 decimal place balance, (W1). A sample of dry sodium percarbonate (about 20 g) is placed on the petri dish which is gently agitated to generate an even particulate layer across the base of the dish and reweighed on the same balance, (W2). The sample on the petri dish is stored in a room, about 3 m high, wide and long in an atmosphere maintained for a period of 24 hours at 32° C. by a thermostat controlled heater and at 80% Relative Humidity (RH) by introduction of a fine droplet water spray under the control of a humidity detector and weighed on the same balance, (W3). The samples are protected by a shield from the spray.

The moisture pick-up of the sodium percarbonate is calculated as follows:

$$\text{Moisture Pick up (g/kg)} = \frac{1000 \times (W3 - W2)}{(W2 - W1)}$$

The extent of moisture pick-up is indicative of the capability of the product to extract moisture from its immediate environment, and thus of the stability of the product when exposed to humid conditions, for example those which can be generated in detergent or bleach/additive compositions containing substances like molecular sieves that are capable of absorbing and releasing a significant proportion of moisture.

In the Tables, this is indicated by MPU.

Heat Emission

This was measured by transferring a sample of the percarbonate into a microcalorimeter, model LKB 2277, also called a Thermal Activity Monitor which is marketed by Thermometric Limited, Sweden in which a temperature of 40° C. is maintained. The heat from the sample over a standard period of 16 hours is measured. In the Tables, this measurement is indicated by LKB40. This is the test by which the heat emission of the claimed products herein is judged.

A low reading indicates an intrinsically stable product, ie before the product is contacted with detergent composition or any other diluent.

Available Oxygen—Avox

Avox herein was measured by dissolving a weighed sample (about 0.2 g) in about 100 mls of 10% w/w sulphuric acid and titrating the solution against standard potassium permanganate solution.

Storage Stability

The storage stability of the products was tested in one of two general methods.

In a rapid method, 50 parts by weight of percarbonate was blended with 50 parts by weight of a detergent constituent, specifically a detergent builder, Zeolite 4A powder obtained from Aldrich Chemicals to give an even distribution and its available oxygen (Avox) measured. The blend was stored in an open beaker housed in a constant environment chamber at 32° C./80% relative humidity and samples were taken after specified periods of storage and analyzed for residual Avox. A comparison of the Avox before and after storage is a demonstration of the stability of the product.

This method for determining percarbonate stability is referred to in the Tables as "Avox Recovery Rapid".

In a second method, usually conducted over periods of weeks, 15 parts by weight of percarbonate was blended with 85 parts by weight of one of the detergent compositions indicated below and 50 g samples housed in small sealed polyethylene coated cardboard cartons (Howarth Packaging) with moisture permeability of 65.31 g m$^{-2}$ day$^{-1}$, measured at 32° C./80% relative humidity. The cartons were stored in a constant environment chamber at 32° C./80% relative humidity and the Avox content after storage was compared with that before storage.

The reference percarbonate free compositions blended with the coated percarbonate (to obtain compositions according to the present invention) were as follows:

| Reference detergent base A (P-free IEC base) | |
|---|---|
| Constituent | % w/w |
| Na linear alkylbenzene sulphonate | 9.7 |
| Ethoxylated tallow alcohol | 5.2 |
| Soap | 3.6 |
| Foam inhibitor | 6.5 |
| Zeolite 4A | 32.5 |

-continued

Reference detergent base A (P-free IEC base)

| Constituent | % w/w |
|---|---|
| Na carbonate | 11.8 |
| Na acrylate/maleate copolymer | 5.2 |
| Na silicate (3.3:1) | 3.4 |
| CMC | 1.3 |
| Na EDTA | 0.3 |
| Stilbene optical brightener | 0.3 |
| Na sulphate | 7.4 |
| Proteolyte enzyme | 0.6 |
| Moisture | 12.2 |

The long term test for percarbonate, in which it was mixed with detergent A and stored in small polyethylene coated cartons, is the stability test by which the claimed products is judged.

Reference Detergent B

Bleach-free detergent base of a commercially available laundry detergent composition containing zeolitie 4A builder Reference Detergent C Bleach-free detergent base of a second commercially available laundry detergent composition containing zeolite 4A builder The method of determinin the stability of the percarbonate during storage mixed with one of the Reference Detergents is referred to in Tables herein as "Avox Recovery Det A, B or C, as the case may be. The stability is expressed in terms of the proportion of Avox remaining after storage for 6 weeks, unless otherwise stated.

EXAMPLES 1 AND 2

In these Examples, a solution of sucrose (3009) in water (7009) was prepared and employed in process P1 to provide coating of respectively 1.8% and 3.0% by weight on feedstock F5.

TABLE 1

| | Ex 1 | Ex 2 |
|---|---|---|
| % Avox | 14.3 | 14.2 |
| Bulk Density g/cm$^3$ | 1.02 | 0.91 |
| Solubility min | 1.3 | 1.5 |
| LKB40 µW | 4.3 | 2.7 |

From Table 1, it can be seen that products were obtained which each had an excellent Avox and rate of solubility. The heat emission under the test conditions, and although it was a coated product which led to an increase in heat emission, showed an absolute figure within the range which would have been observed for a typical uncoated conventional Chloride-salted out "wet route" percarbonate indicating that the combination of salt-free feedstock with invention coating process is an advantageous combination.

EXAMPLES 3, 4 and COMPARISONS C5 to C14

In these Examples and Comparisons, process P1 was followed employing 103.1 g of the coating solutions summarized in Table 2 per kg of feedstock F1 to provide a total coating of 3% by weight coating agents. The coating solutions contained sodium sulphate and chloride in addition to either sucrose or comparison material.

TABLE 2

| Ex/ Comp | Organic agent | Amount G | $H_2O$ G | $Na_2SO_4$ g | NaCl g |
|---|---|---|---|---|---|
| 3 | Sucrose | 12 | 70 | 16.32 | 1.68 |
| 4 | Sucrose | 18 | 70 | 10.88 | 1.12 |
| C5 | D-glucose | 12 | 70 | 16.32 | 1.68 |
| C6 | D-glucose | 18 | 70 | 10.88 | 1.12 |
| C7 | D-lactose | 12 | 70 | 16.32 | 1.68 |
| C8 | D-lactose | 18 | 70 | 10.88 | 1.12 |
| C9 | L-ascorbate | 12 | 70 | 16.32 | 1.68 |
| C10 | L-ascorbate | 18 | 70 | 10.88 | 1.12 |
| C11 | Mannitol | 12 | 70 | 16.32 | 1.68 |
| C13 | Sorbitol | 12 | 70 | 16.32 | 1.68 |
| C14 | Sorbitol | 18 | 70 | 10.88 | 1.12 |

The resultant coated products were found to be free-flowing powders and the stability of the products in the presence of a detergent base was compared in the standard method using Reference Detergent C. The results are summarized in Table 3

TABLE 3

| Reference Detergent C containing the product of | 5 Avox recovery 6 weeks |
|---|---|
| Ex 4 | 61 |
| Comp 6 | 35 |
| Comp 8 | 40 |
| Comp 10 | 31 |
| Comp 12 | 28 |
| Comp 14 | 37 (4 wk) |

From Table 3 it can be seen that the products coated with the sucrose containing mixtures were markedly more stable than related products containing a similar amount of glucose, lactose, ascorbate, mannitol or sorbitol thereby demonstrating the outstanding nature of sucrose at even low amounts in the range of 1 to 2% w/w for coating percarbonate.

EXAMPLES 15 to 28

In these Examples a number of other coated percarbonate products were obtained and tested which employed sucrose in combination with one or more co-coating agents to coat the specified feedstock and to provide a total coating amount shown in Table 4 below. NaG indicates sodium gluconate; NaT disodium tartrate: NaC Trisiodium citrate;

TABLE 4

| Ex No. | Feed Stock | Coating solution composition constituent in g/kg | | | | | Weight Coat % |
|---|---|---|---|---|---|---|---|
| | | Sucrose | | | | Water | |
| Ex 15 | F1 | 120 | $Na_2SO_4$ 180 | | | 700 | 3 |
| Ex 16 | F1 | 180 | $Na_2SO_4$ 120 | | | 700 | 3 |
| Ex 17 | F2 | 60 | $Na_2SO_4$ 108.8 | NaCl 11.2 | NaG 120 | 700 | 3 |
| Ex 18 | F2 | 120 | $Na_2SO_4$ 108.8 | NaCl 11.2 | NaG 60 | 700 | 3 |
| Ex 19 | F2 | 60 | $Na_2SO_4$ 108.8 | NaCl 11.2 | NaT 120 | 700 | 3 |

TABLE 4-continued

| Ex No. | Feed Stock | Coating solution composition constituent in g/kg | | | | | Weight Coat % |
|---|---|---|---|---|---|---|---|
| | | Sucrose | | | | Water | 3 |
| Ex 20 | F2 | 120 | Na$_2$SO$_4$ 108.8 | NaCl 11.2 | NaT 60 | 700 | 3 |
| Ex 21 | F2 | 60 | Na$_2$SO$_4$ 108.8 | NaCl 11.2 | NaC 120 | 700 | 3 |
| Ex 22 | F2 | 120 | Na$_2$SO$_4$ 108.8 | NaCl 11.2 | NaC 60 | 700 | 3 |
| Ex 23 | F3 | 180 | Na$_2$SO$_4$ 60 | MgCl$_2$ 60 | | 700 | 3 |
| Ex 24 | F3 | 180 | CaCl$_2$ 120 | | | 700 | 3 |
| Ex 25 | F3 | 180 | MgSO$_4$ 60 | NaCl 60 | | 700 | 3 |
| Ex 26 | F3 | 91 | MgSO$_4$ 273 | | | 636 | 5 |
| EX 27 | F3 | 91 | MgSO$_4$ 273 | | | 636 | 4 |
| Ex 28 | F3 | 300 | MgSO$_4$ 210 | | | 490 | 3 |

The reasultant products were all found to have a bulk density in the range of 0.90 to 1.04 g/cm$^3$. A number of the other properties of the products are summarized in Table 5 below.

TABLE 5

| Ex No | Avox | MPS | Solubility | LKB40 | Avox Recovery Rapid | Avox Recovery Det A |
|---|---|---|---|---|---|---|
| 15 | 12.8 | 877 | 1.15 | 14.7 | 39 | |
| 16 | 12.87 | 903 | 1.05 | 15.2 | 45 | 54 |
| 17 | 13.17 | 545 | 1.10 | 9.9 | | |
| 18 | 13.22 | 474 | 1.20 | 7.1 | | |
| 19 | 13.35 | 624 | 1.10 | 5.4 | | |
| 20 | 13.39 | 578 | 1.20 | 6.4 | | |
| 21 | 13.13 | 613 | 1.20 | 2.9 | | |
| 22 | 13.19 | 587 | 0.90 | 3.4 | | |
| 23 | 13.47 | 745 | 0.90 | 5.3 | 34 | 55 |
| 24 | 13.47 | 639 | 0.90 | 12.5 | 32 | 42 |
| 25 | 13.47 | 612 | 0.80 | 3.6 | 38 | 46 |
| 26 | 13.18 | 578 | 0.90 | 13.7 | 39 | |
| 27 | 13.26 | 557 | 0.80 | 15.2 | 34 | |
| 28 | 13.53 | 541 | 0.80 | 18.0 | 31 | |

By way of comparison, uncoated percarbonate feedstocks obtained from the same process that produced feedstocks F2 to F4, retained on average in the long term storage stability test herein, approximately 25 Avox after 6 weeks storage mixed with Detergent Composition A ie in small boxes at 32° C. and 80% relative humidity.

From Table 5 it can be seen that the products coated with a mixture of sucrose and a selection of inorganic salts and carboxylate salts as co-coating agents showed a much improved solubility, and that the heat emission was lower in the presence of sodium salts and tended to be higher in the presence of magnesium or calcium salts. The coated products were made in at least some Examples with little or no loss of Avox. The invention coated products were significantly more stable than the uncoated feedstock percarbonate.

EXAMPLES 29 to 37

In these Examples sodium percarbonate is coated with a number of combinations of sucrose plus a co-coating agent as summarized in Table 6 having properties summarized in Table 7. In subsequent Tables NaCMC indicates the sodium salt of carboxymethylcellulose silicate indicates sodium silicate having a mole ratio of Na$_2$O:SiO$_2$ of 1:2 and MgC indicates MgCl$_2$.2H$_2$O. In Examples 35 and 37 the coating was applied in two layers with intermediate drying between the application of the coating solutions.

TABLE 6

| Ex No | Feed Stock | Coating solution composition constituent in g/kg | | | | Water | Weight Coat % |
|---|---|---|---|---|---|---|---|
| | | Sucrose | | | | | |
| Ex 29 | F6 | 180 | Na$_2$SO$_4$ 108.8 | NaCl 11.2 | | 700 | 3 |
| Ex 30 | F5 | 178 | MgCO$_3$ 40 | NaCMC 10 | Talc 79 | 693 | 3 |
| Ex 31 | F5 | 180 | Na$_2$SO$_4$ 120 | | | 700 | 3 |
| Ex 32 | F5 | 152.5 | MgSO$_4$ 254.5 | | | 593 | 3 |
| Ex 33 | F5 | 180 | Na$_2$SO$_4$ 60 | MgC 60 | | 700 | 3 |
| Ex 34 | F5 | 180 | Na$_2$SO$_4$ 120 | | | 700 | 3 |
| Ex 35 1$^{st}$ | F5 | | Silicate 618.8 | | | 381.2 | 3 |
| 2$^{nd}$ | | 180 | Na$_2$SO$_4$ 120 | | | 700 | 2 |
| Ex 36 | F5 | 152.5 | MgSO$_4$ 254.5 | | | 593 | 3 |
| Ex 37 1$^{st}$ | F5 | | Silicate 618.8 | | | 381.2 | 4 |
| 2$^{nd}$ | | 152.5 | MgSO$_4$ 254.5 | | | 593 | 2 |

TABLE 7

| Ex No | Avox | MPS | Solubility | LKB40 | Avox Recovery Rapid |
|---|---|---|---|---|---|
| 29 | 14.16 | 993 | 1.2 | 4.0 | 61 |
| 30 | 14.28 | 917 | 1.4 | 1.0 | 58 |
| 31 | 14.17 | 856 | 1.1 | 1.2 | 61 |
| 32 | 14.4 | 670 | 1.3 | 5.2 | 46 |
| 33 | 14.3 | 856 | 1.4 | 1.0 | 58 |
| 34 | 14.23 | 921 | 1.3 | 0.9 | 60 |
| 35 | 13.93 | 1208 | 1.7 | 3.9 | 67 |
| 36 | 14.37 | 826 | 1.3 | 6.3 | 56 |
| 37 | 13.95 | 786 | 2.2 | 4.1 | 59 |

From the results summarized in Table 7 it can he seen that many of the invention coatings of the selected feedstock demonstrated a valuable combination of properties including very high retained Avox after coating, fast solubility, low heat emission and improved stability even with a low level of coating agent.

EXAMPLES 38 to 51

In these Examples, yet further combinations of sucrose plus co-coating agents were prepared and their properties summarized in respectively Tables 8 and 9. In the Tables that follow NaP indicates sodium phosphate of formula Na$_2$HPO$_4$.2H$_2$O and STPP indicates sodium tripolyphosphate. * indicates that the result after 4 weeks storage is shown.

TABLE 8

| Ex No | Feed Stock | Coating solution composition constituent in g/kg | | | Weight Coat % |
|---|---|---|---|---|---|
| | | Sucrose | | water | |
| Ex 38 | F4 | 180 | Silicate 247.5 | | 572.5 | 3 |
| Ex 39 | F4 | 120 | Silicate 371.3 | | 508.3 | 3 |
| Ex 40 | F4 | 173 | Silicate 190.3 | Talc 34.6 | 602 | 3 |
| Ex 41 | F4 | 171.54 | Silicate 247.6 | Glycerol 8.6 | 572.4 | 3 |
| Ex 42 | F4 | 180 | NaP 120 | | 700 | 3 |
| Ex 43 | F4 | 150 | NaP 150 | | 700 | 3 |
| Ex 44 | F4 | 120 | NaP 180 | | 700 | 3 |
| Ex 45 | F4 | 147.5 | STPP 147.5 | NaCMC 4.9 | 700 | 3 |
| Ex 46 | F4 | 140 | $Na_2SO_4$ 210 | | 700 | 3 |
| Ex 47 | F4 | 210 | $Na_2SO_4$ 70 | MgC 70 | 650 | 3 |
| Ex 48 | F4 | 210 | $Na_2SO_4$ 140 | | 650 | 3 |
| Ex 49 | F4 | 100 | $Na_2SO_4$ 150 | | 750 | 3 |
| Ex 50 | F4 | 150 | $Na_2SO_4$ 100 | | 750 | 3 |
| Ex 51 | F4 | 140 | $Na_2SO_4$ 140 | MgC 70 | 650 | 3 |

TABLE 9

| Ex No | Avox | MPS | Solubility | LKB40 | Avox Recovery Rapid | Avox Recovery Det A |
|---|---|---|---|---|---|---|
| 38 | 13.72 | 545 | 1.1 | 39 | 43 | 56 |
| 39 | 13.65 | 574 | 0.7 | 5.3 | 55 | 47 |
| 40 | 13.74 | 680 | 1.2 | 2.9 | 49 | 41 |
| 41 | 13.67 | 562 | 0.9 | 4.4 | 42 | 48 |
| 42 | 13.52 | 536 | 1.2 | 2.1 | 38 | 43* |
| 43 | 13.65 | 619 | 1.2 | 2.5 | 31 | |
| 44 | 13.82 | 558 | 1.2 | 2.0 | | |
| 45 | 13.32 | 587 | 1.2 | 2.9 | | 52* |
| 46 | 13.71 | 567 | 1.2 | 1.2 | 36 | 48 |
| 47 | 13.76 | 600 | 1.5 | 2.1 | 40 | 46 |
| 48 | 13.78 | 589 | 1.25 | 1.2 | 35 | 50 |
| 49 | 13.80 | 669 | 1.25 | 1.6 | 40 | 49 |
| 50 | 13.79 | 623 | 1.2 | 1.6 | 37 | 42 |
| 51 | 13.79 | 591 | 1.3 | 4.4 | 30 | 42 |

From the results summarized in Table 9 it can be seen that employing as feedstock a conventionally salted out percarbonate it is still possible to obtain coated products having fast solubility, an acceptable heat emission and improved stability.

EXAMPLES 52 to 55 and COMPARISONS C56 to C59

In these Examples and Comparisons products coated with the invention combination of coating agents are compared with known coating materials. The coating conditions and results are summarized in respectively Tables 10 and 11. The results for C 59 are for the percarbonate feedstock F6 alone.

TABLE 10

| Ex No | Feed Stock | Coating solution composition Constituent in g/kg | | | Weight Coat % |
|---|---|---|---|---|---|
| | | Sucrose | Water | | |
| Ex 52 | F6 | 180 | Silicate 248 | | 572 | 3 |
| Ex 53 | F6 | 180 | Silicate 248 | | 572 | 3 |
| Ex 54 | F6 | 180 | $Na_2SO_4$ 120 | | 700 | 3 |
| Ex 55 | F6 | 180 | $Na_2SO_4$ 120 | | 381 | 3 |
| Comp 56 | F6 | | Silicate 619 | | 381 | 3 |
| Comp 57 | F6 | | $Na_3CO_3$ 163 | $Na_2SO_4$ 87 | 750 | 3 |
| Comp 58 | F6 | | $Na_2SO_4$ 250 | | 750 | 3 |

TABLE 11

| Ex No | Sol-ubility | LKB40 | MPU | Avox Recov Rapid | Avox Recov Det A | Avox Recov Det B | Avox Recov Det C |
|---|---|---|---|---|---|---|---|
| 52 | 1.3 | 4.0 | 5.6 | 76 | 78 | 58 | 71 |
| 53 | 1.4 | 3.6 | 5.5 | 72 | 75 | 57 | 71 |
| 54 | 1.2 | 1.0 | 5.3 | 71 | 73 | 60 | 64 |
| 55 | 1.7 | 1.1 | 5.7 | 74 | 68 | 60 | 64 |
| C 56 | 3.7 | 5.9 | 5.9 | 68 | 57 | 23 | 50 |
| C 57 | 1.8 | 4.5 | 3.8 | 64 | 58 | 25 | 44 |
| C 58 | 1.8 | 1.6 | 3.1 | 67 | 60 | 23 | 57 |
| C 59 | 1.2 | 0 | 1.4 | 51 | 46 | <5 | 26 |

From Table 11 it can be seen that the invention products demonstrated markedly superior stability to coated products which have hitherto been recognized as demonstrating one or more excellent properties and especially in the presence of detergent compositions that are aggressive that is to say cause comparatively rapid decomposition of sodium percarbonate. The demonstration of stability is noteworthy in that it is achieved at low levels of coating agent which enable the product to dissolve at substantially the same rate as the uncoated feedstock and without increasing the moisture pick-up and heat emission rate to unacceptable levels. It can also be observed that the improvement in storage stability in the invention coated percarbonate is achieved despite the fact that some of the comparison coated percarbonates manifested a lower moisture pick-up which would otherwise have been expected to accelerate decomposition.

What is claimed is:

1. A process for stabilizing a particulate alkali metal percarbonate by coating it with an amount of a coating material wherein the coating material comprises not more than 5% by weight based on the coated material of a non-reducing oligomeric saccharide.

2. A process according to claim 1 wherein the alkali metal percarbonate is sodium percarbonate.

3. A process according to claim 1 wherein the non-reducing saccharide is sucrose.

4. A process according to claim 1 wherein the coating material contains a co-coating agent.

5. A process according to claim 4 wherein the co-coating agent is an inorganic salt chosen from an alkali or alkaline earth metal carbonate, sequicarbonate, silicate, chloride, sulphate, phosphate, and mixtures thereof.

6. A process according to claim 5 wherein the coating agent comprises sucrose plus silicate or sulphate or a mixture of carbonate and chloride.

7. A process according to claim 1 wherein the coated percarbonate comprises from 0.5 to 2.5% by weight of sucrose plus at least 0.5% by weight inorganic co-coating agent.

8. A process according to claim 1 wherein the coated alkali metal percarbonate comprises from 0.5 to 20% by weight of the coating agent.

9. A process according to claim 1 wherein the coating is applied by contacting an aqueous solution of the coating agent with particulate percarbonate to form wetted particles and thereafter drying the wetted particles by agitation and contact with a water-removing gas.

10. A process according to claim 9 wherein the solution of coating agent is free from suspended co-coating agent.

11. A process according to claim 9 wherein the wetted percarbonate particles are both agitated and fluidized by an updraft of the water-removing gas.

12. A process according to claim 9 wherein the wetted particles are fluidized and dried at a bed temperature in the range of 30 to 90° C.

13. A process according to claim 10 wherein the percarbonate particles are contacted with the coating solution in a mixer, the temperature of solution in the mixer being from 10 to 60° C., and then dried in a fluid bed, the temperature of the fluid bed being from 50 to 90° C.

14. Particulate alkali metal percarbonate coated with an amount of a coating material comprising not more than 5% by weight based on the coated material of a non-reducing oligomeric saccharide, obtainable by a process according to claim 1.

15. The coated percarbonate according to claim 14 having 90% solubility within 1.7 minutes and an Avox retention of at least 64% after 6 weeks storage.

16. The coated percarbonate according to claim 14 wherein the coating represents 2 to 5% by weight of the coated product.

17. The coated percarbonate according to claim 14 wherein the percarbonate has a mean particle size of from 600 to 850 $\mu$m.

18. The coated percarbonate according to claim 14 having a heat emission at 40° C. of below 4 $\mu$W/g.

19. The coated percarbonate according to claim 17 containing at least 12.5% Avox.

20. The washing or bleaching composition containing at least on washing agent and a coated particulate alkali metal percarbonate according to claim 14.

21. The process according to claim 7 wherein the coated percarbonate comprises from 1 to 2% by weight of sucrose plus at least 1 to 6% by weight inorganic co-coating agent.

22. The process according to claim 12 wherein the bed temperature is in the range of 60 to 80° C.

23. The process according to claim 13 wherein the temperature of the fluid bed is from 60 to 80° C.

24. The coated percarbonate according to claim 15 having an Avox retention of at least 70% after six weeks storage.

25. The coated percarbonate according to claim 17 having a mean particle size of at least 700 $\mu$m.

26. The coated percarbonate according to claim 18 having a heat emission at 40° C. of below 1.5 $\mu$W/g.

27. The coated percarbonate according to claim 19 containing at least 14% Avox.

* * * * *